United States Patent [19]
Yamasa et al.

[11] Patent Number: 5,936,591
[45] Date of Patent: Aug. 10, 1999

[54] MULTI-BEAM FEEDING APPARATUS

[75] Inventors: Yasuhiko Yamasa, Yokohama; Hiroki Shoki, Kawasaki; Minoru Okumura, Yokohama, all of Japan

[73] Assignees: Advanced Space Communications Research Laboratory (ASC), Tokyo; Kabushiki Kaisha Toshiba, Kawasaki, both of Japan

[21] Appl. No.: 08/811,716

[22] Filed: Mar. 6, 1997

[30]     Foreign Application Priority Data

Apr. 11, 1996 [JP] Japan .................................. 8-089589

[51] Int. Cl.⁶ ...................................................... H01Q 21/00
[52] U.S. Cl. ........................... 343/853; 343/840; 342/373
[58] Field of Search ..................... 343/778, 779, 343/840, 853, 781 R; 342/372, 373, 374, 375

[56]                References Cited

U.S. PATENT DOCUMENTS

| | | | |
|---|---|---|---|
| 4,342,997 | 8/1982 | Evans | 343/853 |
| 4,689,627 | 8/1987 | Lee et al. | 343/778 |
| 4,827,270 | 5/1989 | Udagawa | 343/853 |
| 5,162,803 | 11/1992 | Chen | 342/372 |
| 5,414,433 | 5/1995 | Chang | 342/375 |

*Primary Examiner*—Don Wong
*Assistant Examiner*—Tan Ho
*Attorney, Agent, or Firm*—Oblon, Spivak, McClelland, Maier & Neustadt, P.C.

[57]           ABSTRACT

A multi-beam feeding apparatus according to the present invention is a feeding apparatus for a multi-beam antenna comprising a reflector and a primary radiator comprising a plurality of element antennas, and the apparatus is provided with a plurality of beam forming networks for setting an excitation distribution relative to the element antenna necessary for every beam. Each beam forming network is connected via a combiner (a divider) disposed to every of all the element antennas. According to this construction, not only there is such an advantage that a variation of capacity of communication between the beams and the like can be flexibly responded, but also there are such effects that a beam forming network can be so simply constructed that the same systems are only combined, a power can be more effectively used, such a problem as a heat generation and the like can be reduced. Moreover, a plurality of missions can be easily fused. Thereby, communication can be more flexible, a power loss relating to a large power transmission can be easily solved, and an necessary excitation distribution can be easily set at a low cost.

4 Claims, 8 Drawing Sheets

| BEAM | NUMBER OF ELEMENT ANTENNAS WHICH CLUSTER COMPRISES | |
|---|---|---|
| | ELEMENT ANTENNAS LOCATED AT CENTER | ELEMENT ANTENNAS LOCATED AT PERIPHERY |
| #1 | T1 | T2, T5, T6, T7, T15, T16 |
| #2 | T2 | T1, T3, T7, T8, T9, T15 |
| #3 | T3 | T2, T4, T9, T10, T14, T15 |
| #4 | T4 | T3, T10, T11, T12, T13, T14 |

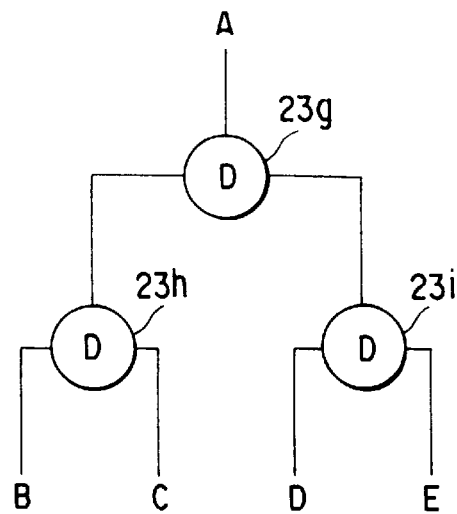
F I G. 9
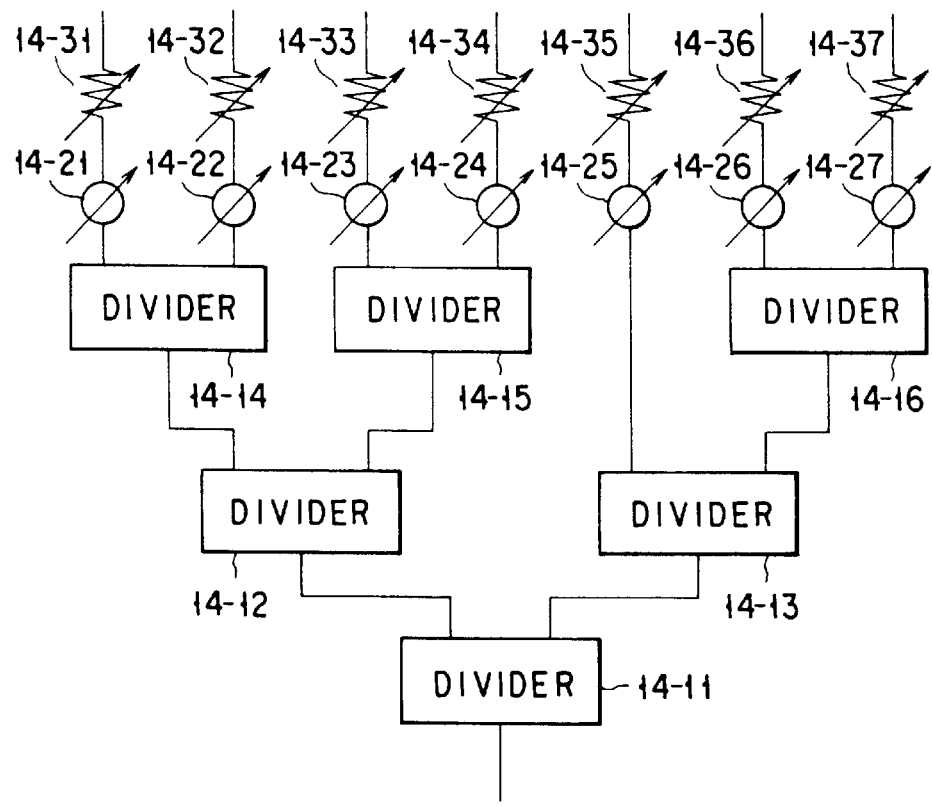
F I G. 10

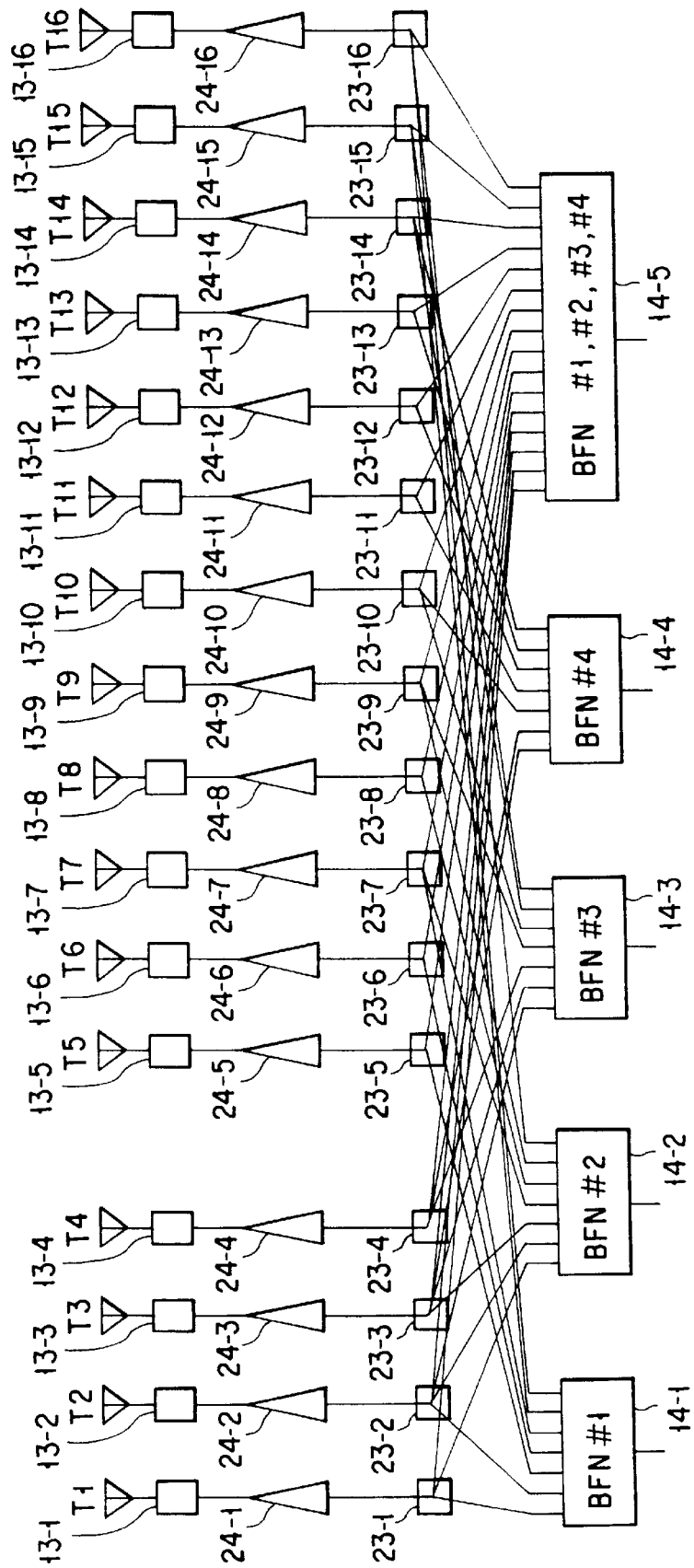
F I G. 11

MULTI-BEAM FEEDING APPARATUS

BACKGROUND OF THE INVENTION

The present invention relates to a multi-beam feeding apparatus for a primary feed radiator of a reflector antenna to be mounted to a satellite.

Recently, as a demand for satellite communications and satellite broadcasting increases, a higher function for satellite antennas is required. For example, there are such important objects of future satellite antennas that a plurality of missions are shared with one antenna, a gain is increased in order to increase a capacity of communication, and an amount of communication in a plurality of beams is flexibly changed according to traffic conditions.

An example of such demands and a construction of the antenna thereto will be explained below.

FIG. 1 shows a model of a multi-beam satellite communication using four beams. In order to effectively use frequency resources, for example, the same frequency band is reused at intervals of two beams (in FIG. 1, beam #1 and beam #4 use the same the frequency band, respectively). In order to realize the frequency reuse as requirement, a technique that generates a low side lobe radiation pattern is important for Satellite antennas. For example, a radio wave radiated as a beam #1 is needed to have the low side lobe levels in its radiation pattern within this region in such a manner that the radio wave does not interfere with a coverage of a beam #4 using the same frequency band.

As an antenna apparatus for realizing such a low side lobe characteristic, the antenna comprising a reflector 11 and a primary radiator 12 is considered, as shown in FIG. 2.

As shown in FIG. 3A, the primary radiator 12 comprises sixteen element antennas T1 to T16, and each beam #1 to #4 is formed by a cluster comprising seven element antennas respectively, as shown in FIG. 3B. For example, the cluster forming the beam #1 comprises seven element antennas T1, T2, T5, T6, T7, T15 and T16 arranged around the element antenna T1.

Thus, one beam is formed by a plurality of element antennas and an appropriate excitation distribution is set relative to each element antenna, thereby it is possible to allow its synthesized pattern to have the low side lobe characteristic.

Furthermore, by the demand for enhancing a crossover level (the gain on a boundary between the beams), some of element antennas constituting the cluster are shared between the adjacent beams. For example, four element antennas T1, T2, T7 and T15 are shared between the cluster forming the beam #1 and the cluster forming the beam #2.

The above view is already used for many multi-beam antennas to be mounted to the satellite. A conventional system of the multi beam feeding apparatus thereof will be described below.

FIG. 4 is an example showing the construction of the conventional multi-beam feeding apparatus. Each element antenna T1 to T16 is connected to each beam forming network (BFN) 14-1 to 14-4 comprised for every beam #1 to #4 via filters 13-1 to 13-16 for removing an unnecessary radiation, respectively.

Each path of the element antennas T1 to T4, T7, T9, T10, T14 and T15 relating to a formation of a plurality of beams is connected to each diplexer 15-1 to 15-9. When a signal is transmitted, each diplexer 15-1 to 15-9 combines the signals from the beam forming network 14-1 to 14-4, respectively, and the combined signal is conducted to the corresponding element antennas T1 to T4, T7, T9, T10, T14 and T15, so that the signal is radiated to a space. Furthermore, when the signal is received, the received signals from the corresponding element antennas T1 to T4, T7, T9, T10, T14 and T15 are splitted for every frequency band, respectively, and the splitted signals are sent to the corresponding beam forming network 14-1 to 14-4.

The beam forming network 14-1 to 14-4 are so constructed that a divider (a combiner), a phase shifter and the like is used in a such a manner that a predetermined excitation distribution is provided to each element antenna constituting each cluster.

Each amplifier 16-1 to 16-4 for amplifying the signal of each beam #1 to #4 is connected to each beam forming network 14-1 to 14-4, respectively. As these amplifiers 16-1 to 16-4, when the signal is transmitted, a high power amplifier (concretely, a traveling-wave type amplifier tube, a solid-state power amplifier or the like) is used.

In this system, since the beam forming network 14-1 to 14-4 can flexibly set the excitation distribution of the element antennas T1 to T16, there is an advantage that an optimal low side lobe pattern for each beam can be realized for frequency reuse requirement.

However, there is a problem that this system becomes more complex according to the number of beams shared with the diplexers 15-1 to 15-9 connected to the element antennas T1, T2, T5, T6, T7, T15 and T16 shared with a plurality of beams #1 to #4.

Furthermore, in BFNs 14-1 to 14-4, it is necessary to set the excitation distribution considering the characteristics of the diplexers 15-1 to 15-9 connected to each antenna element T1 to T16. Accordingly, a design and the construction of BFNs 14-1 to 14-4 become more complex.

In addition, this system is constructed assuming that the frequency band of each beam #1 to #4 is fixed and is not changed. Therefore, the frequency band and the capacity of communication cannot be flexibly changed in response to the amount of calls of each beam #1 to #4. If the frequency band and the capacity of communication are attempted to be variable, instead of the diplexer, a combiner/divider is used. In this case, a flexibility relative to a variation of the capacity of communication between the beams can be obtained. However, on the other hand, a power loss occurs due to the combiner/divider, thereby there is another problem that a power efficiency is deteriorated and a heat is generated.

BRIEF SUMMARY OF THE INVENTION

As described above, in the conventional multi-beam feeding apparatus, not only the design and construction of the diplexer connected to the element antenna shared with a plurality of beams is more complex, but also in the beam forming network, it is necessary to set the excitation distribution considering the characteristic of the diplexer connected to each element antenna, thereby the design and construction of an entire beam forming network become more complex.

Furthermore, the conventional system is constructed assuming that the frequency band is fixed and is not changed. Therefore, there is a problem that the frequency band and the capacity of communication cannot be flexibly changed in response to the amount of calls of each beam. If the frequency band and the amount of communication are attempted to be variable for each beam capacity, instead of the diplexer, a combiner/divider must be used. In this case, the power loss occurs, thereby there is another problem that the power efficiency is deteriorated and the heat is generated.

In order to overcome the above problems, it is an object of the present invention to provide a multi-beam feeding apparatus comprising a relatively simple construction, which can reduce the power loss relating to a large power transmission, and can easily set the excitation distribution for carrying out the low side lobe.

According to the present invention for overcome the above problems, a multi-beam feeding apparatus used for a multi-beam antenna apparatus forming a plurality of beams by using a primary radiator in which a plurality of element antennas are arranged and a reflector, comprises a plurality of beam forming network disposed to every beam, for setting an excitation distribution relative to the element antenna necessary for a beam formation among the plurality of element antennas, and a plurality of combiners/dividers disposed to each transmission path of the plurality of element antennas, for combining excitation outputs to be provided to the corresponding element antennas from the plurality of beam forming networks, or for dividing a signal from the corresponding element antennas to the corresponding beam forming network.

More specifically, all the plurality of combiners/dividers are same constructed.

Furthermore, when the plurality of combiners/dividers are connected to a plurality of beam forming network, respectively, the combiners/dividers are connected to input/output ports to be in the same phase condition.

That is, the multi-beam feeding apparatus according to the present invention is provided with the beam forming network circuit setting the excitation distribution relative to the element antenna for every beam, thereby it is possible to set a predetermined excitation distribution necessary for carrying out a low side lobe and a shaped beam for every beam. The beam forming network are connected to one another via the combiners/dividers disposed to each of all the element antennas, thereby all the element antennas can be commonly used for a plurality of beams.

Furthermore, all the combiners/dividers are same constructed, thereby the beam forming network can excite the antenna elements via the combiners/dividers having the same construction. Thereby, a simple beam forming network construction such as only a combination of the same systems can be realized.

Furthermore, when the combiners/dividers are connected to a plurality of beam forming networks, respectively, the combiners/dividers are connected to the input/output ports to be in the same phase condition. Accordingly, the beam forming network corresponding to a certain beam excites the antenna element via the combiners/dividers in the same phase condition, thereby, in one antenna system, a plurality of missions can be fused.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporate in and constitute a part of the specification, illustrate presently preferred embodiments of the invention, and together with the general description given above and the detailed description of the preferred embodiments given below, serve to explain the principles of the invention.

FIG. 9 is a block diagram showing another concrete construction of the combiner according to the first embodiment.

FIG. 10 is a block diagram showing another concrete construction of the beam forming network according to the first embodiment.

FIG. 11 is a block diagram showing a construction of the multi-beam feeding apparatus according to a second embodiment of the present invention.

DETAILED DESCRIPTION OF THE INVENTION

Embodiments of the present invention will be explained below with reference to FIGS. 5 to 11.

Embodiment 1

Figure 1:
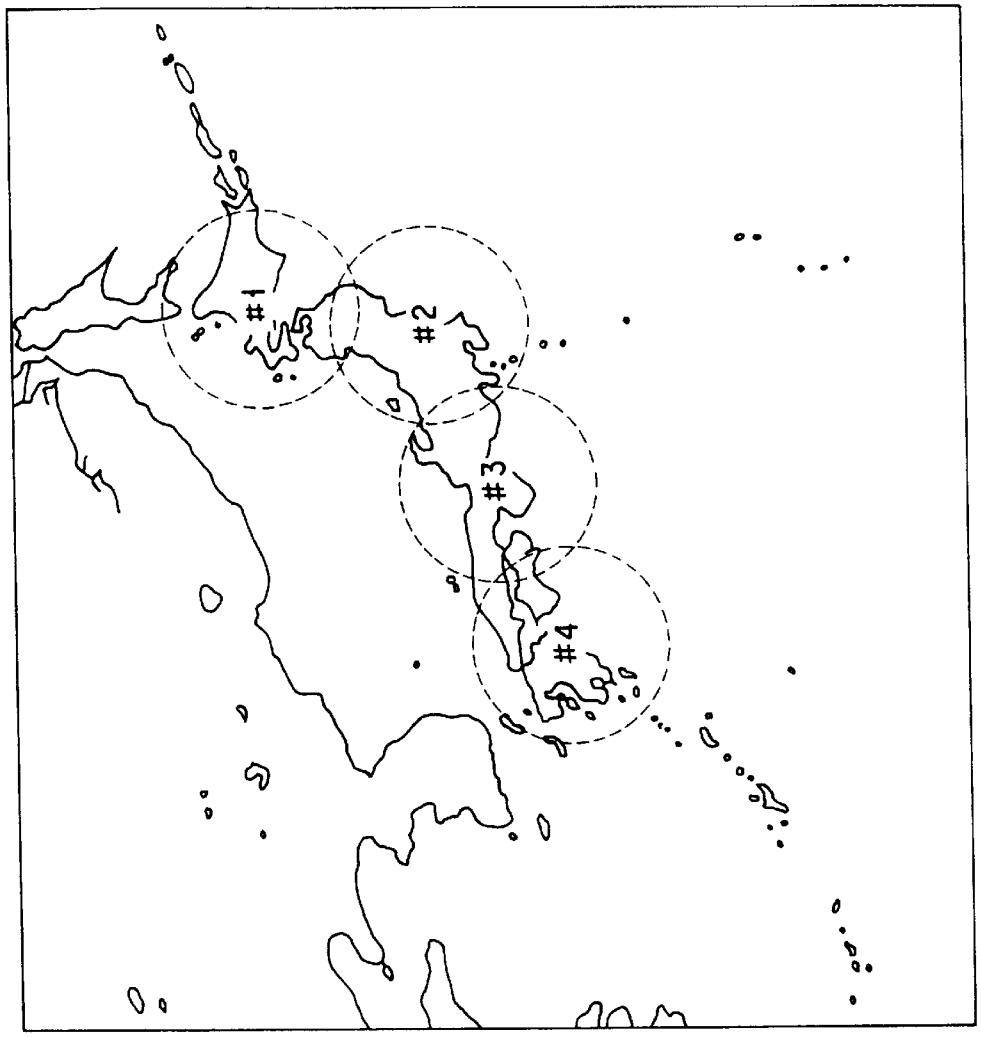
FIG. 1 shows an example of an arrangement of multi-beams.
Figure 5:
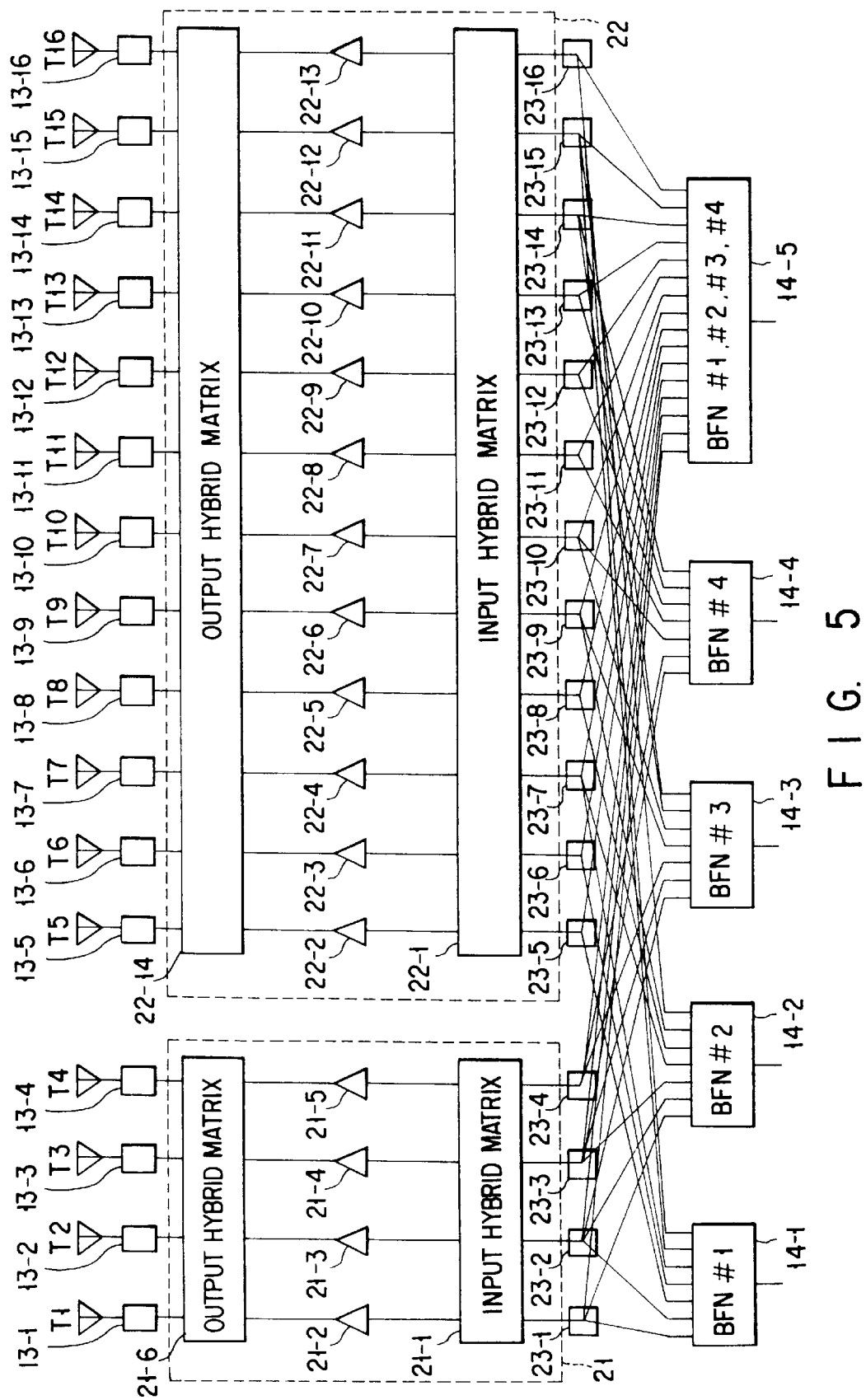
FIG. 5 is a block diagram showing a construction of the multi-beam feeding apparatus according to a first embodiment of the present invention.

FIG. 5 shows a construction of a multi-beam feeding apparatus connected to a primary radiator of the multi-beam antenna as an embodiment of the present invention. The portions having the same reference numerals in FIG. 1 are the same portions in FIG. 5. Different portions will be mainly explained. Furthermore, for a simple explanation, the construction used as a transmission antenna will be explained.

Figure 2:
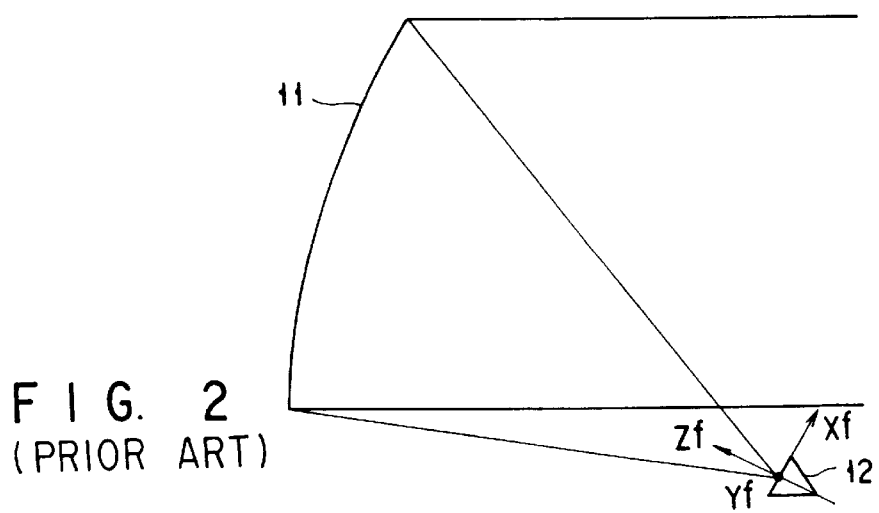
FIG. 2 shows an example of a construction of a multi-beam antenna using a reflector.

As shown in FIG. 2, the entire antenna comprises a reflector 11 and a primary radiator 12. As shown in FIG. 1 as an example, a multi-beam satellite communication (satellite broadcasting) covering a services area by four beams and a shaped beam satellite communication (satellite broadcasting) covering all over four service areas are assumed. In view of an efficient use of the frequency resources, in case of the multi-beam, the same frequency band is reused at intervals of two beams (The beams #1 and #4 have the same frequency).

Figures 3A, 3B:
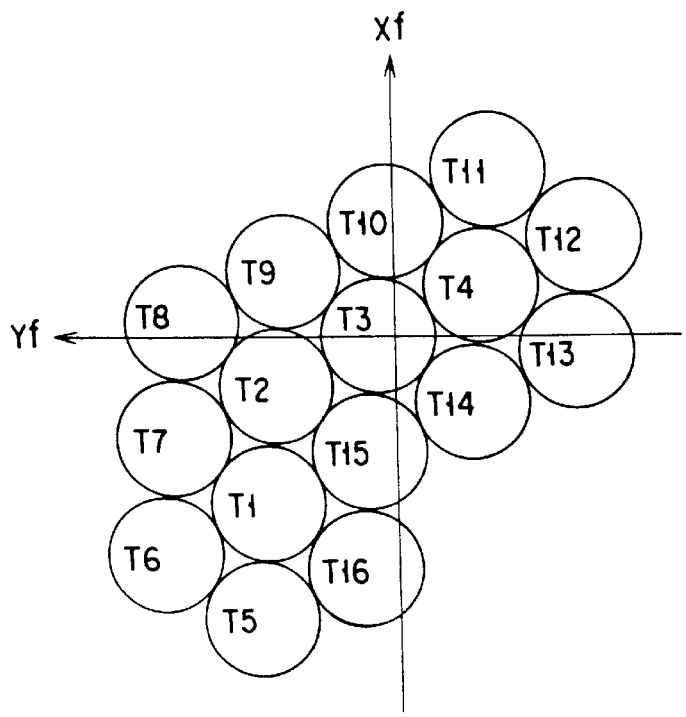
FIGS. 3A and 3B show a construction of a primary radiator in the multi-beam antenna shown in FIG. 2, respectively.
Figure 4:
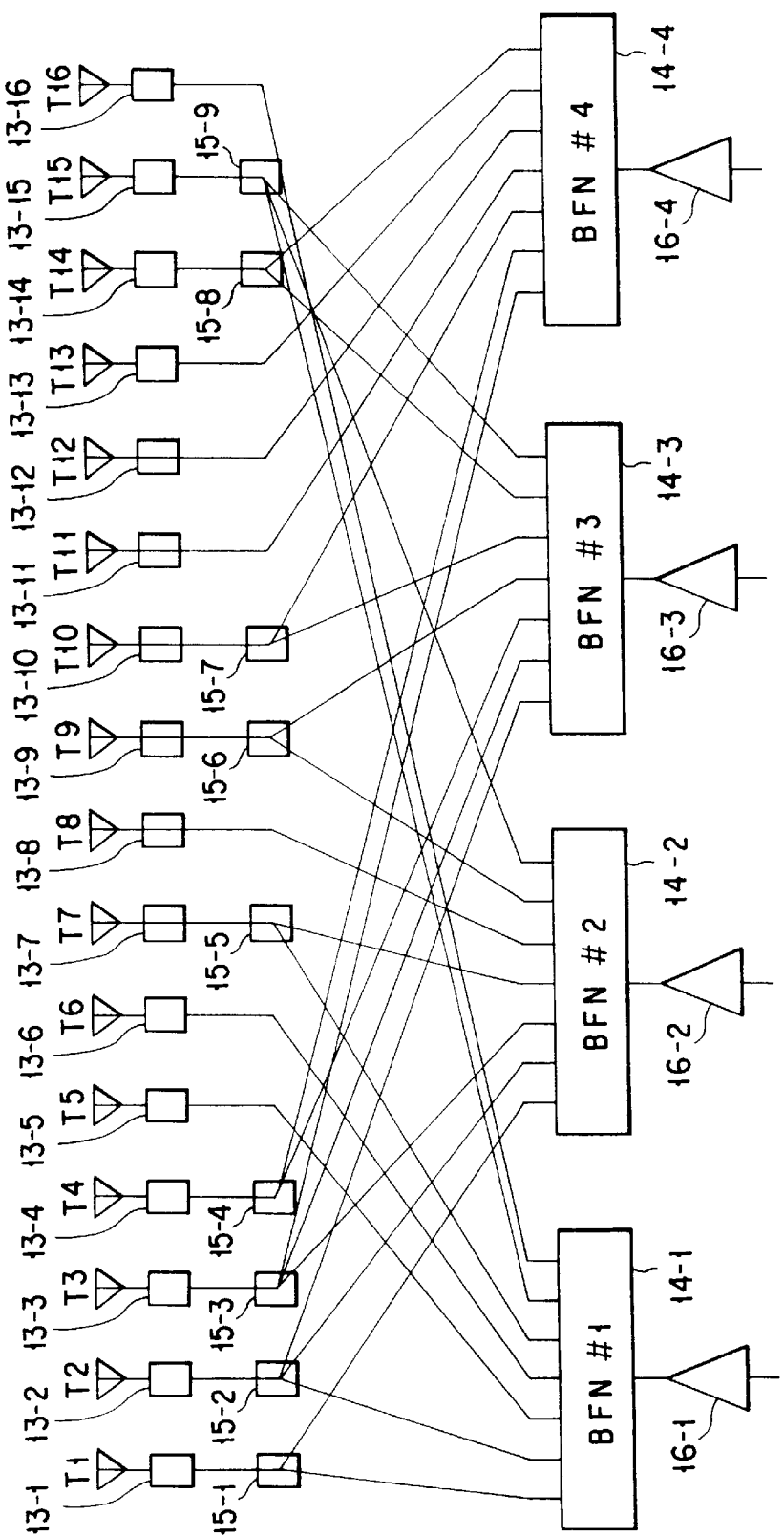
FIG. 4 is a block diagram showing an example of a construction of a conventional multi-beam feeding apparatus.

Furthermore, as shown in FIG. 3A, the primary radiator 12 comprises sixteen element antennas T1 to T16. As shown in FIG. 3B, each beam #1 to #4 of the multi beam is formed by a cluster comprising seven element antennas, respectively. The shaped beam is synthesized by all the element antennas T1 to T16. As the element antennas T1 to T16, independently of the system thereof, a horn antenna, a wire antenna, a planer antenna and the like are used.

The construction of the feeding system of the multi-beam feeding apparatus shown in FIG. 5 and the operation thereof will be explained below.

Each element antenna T1 to T16 is connected to each filter 13-1 to 13-16 suppressing an unnecessary radiation (for example, a nonlinear distortion of the amplifier, a higher harmonic due to an intermodulation and the like), respectively. Each element antenna T1 to T4 which is arranged at the center of each cluster and has a large excitation power is connected to a first hybrid matrix amplifier (HMA) 21 via each filter 13-1 to 13-4, respectively. Each of other element antennas T5 to T16 is connected to a second HMA 22 via each filter 13-5 to 13-16, respectively.

One input port of each HMAs 21 and 22 corresponds to one output thereof, and the signal inputted from the input port is outputted only from a specific output port. In this case, even if the signal is inputted from any input port, the inputted signal is equally distributed to the amplifiers in HMAs 21 and 22, and the inputted signal is amplified. Each input port of HMAs 21 and 22 is connected to combiners 23-1 to 23-16, respectively, and the signal is inputted from beam forming networks (BFNS) 14-1 to 14-4.

Each BFN 14-1 to 14-4 is the beam forming network corresponding to each beam #1 to #4, respectively, and each BFN 14-1 to 14-4 is connected to each input port of HMAs 21 and 22 corresponding to the element antennas constituting each cluster. Furthermore, BFN 14-5 is connected to the paths for all the element antennas T1 to T16 through the combiners 23-1 to 23-16, and an appropriate excitation weight is set in BFN 14-5, thereby the shaped beam for covering the coverage of the beams #1 to #4 can be formed.

Among the element antennas T1 to T16, some element antennas (T1 to T4, T7, T9, T10, T14 and T15) are shared with a plurality of beams. In these element antennas, the signals from BFNs 14-1 to 14-4 of the beams #1 to #4 are combined in the combiners 23-1 to 23-4, 23-7, 23-9, 23-10, 23-14 and 23-15 when the signals are inputted to HMAs 21 and 22.

That is, according to the above construction, the combiners 23-1 to 23-16 are connected to all of each input port of HMAs 21 and 22. Since any input port of HMAs 21 and 22 one to one corresponds to each element antenna T1 to T16, this construction is operated so similarly that an excitation to each element antenna T1 to T16 is carried out via the combiners 23-1 to 23-16.

Since the combiners 23-1 to 23-16 are connected to all of each input port of HMAs 21 and 22, excitation signals from a plurality of BFNs 14-1 to 14-5 are combined, so that the combined signal can be transmitted to the element antennas T1 to T16. As a result, one element antenna can be shared with a plurality of beams. The ports which are not used among the input ports of the combiners 23-1 to 23-16 are connected to non-reflecting terminations.

Next, the construction of HMAs 21 and 22 and the operation thereof will be explained.

HMA 21 provided with each input and output having four ports, respectively, comprises an input hybrid matrix 21-1, amplifiers 21-2 to 21-5 and an output hybrid matrix 21-6, as shown in FIG. 5. In general, the input hybrid matrix 21-1 and the output hybrid matrix 21-6 are constructed as shown in FIG. 6.

Figure 6A:
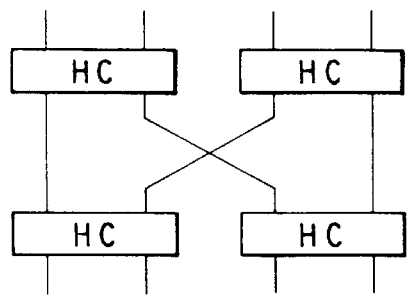
FIGS. 6A, 6B and 6C are block diagrams showing a concrete construction of a matrix combiner according to the first embodiment.
Figure 6B:
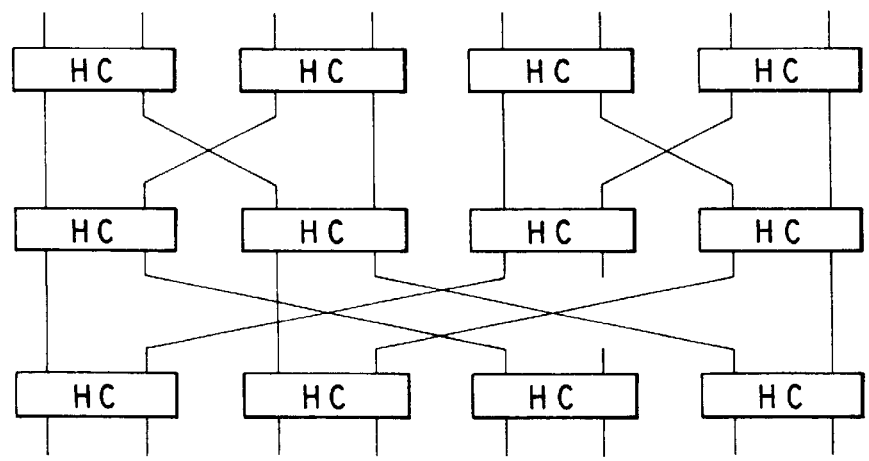
Figure 6C:
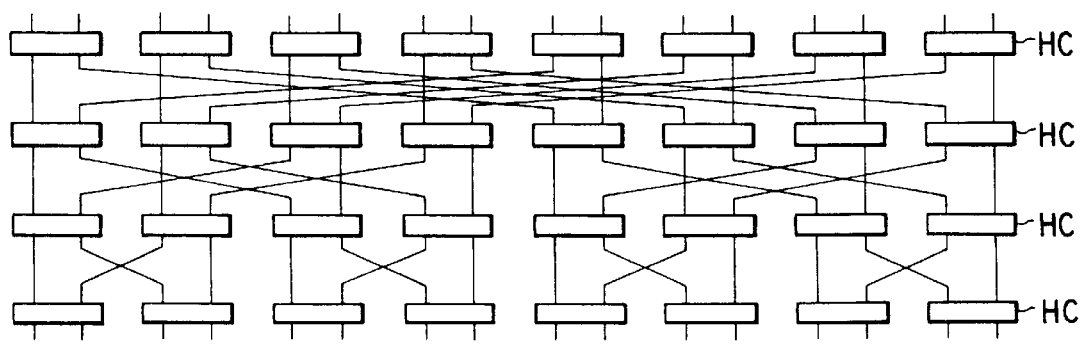

FIG. 6A shows such a construction that hybrid combiners HC having two inputs and two outputs are two-step connected so that the input/output ports can be amounted to four. FIG. 6B shows such a construction that hybrid combiners HC are three-step connected so that the input/output ports can be amounted to eight. FIG. 6C shows such a construction that hybrid combiners HC are four-step connected so that the input/output ports can be amounted to sixteen. Since the input hybrid matrixes 21-1 and the output hybrid matrix 21-6 have four ports, for example, the construction shown in FIG. 3B is used. In this case, it is necessary to connect the non-reflecting terminations to the ports which are not used.

The input hybrid matrix 21-1 constructed as described above is used, thereby the signal of each input port is divided in such a manner that the signal has the same amplitude and a predetermined phase distribution. After then, the distributed signal is connected to simplifiers (for example, SSPA ; Solid-State Power Amplifier) 21-2 to 21-5, and the distributed signal is amplified.

After then, the signal is connected to a construction contrary to the construction at the input side, that is, the output hybrid matrix 21-6, and the signal is amplified in each amplifier 21-2 to 21-5. The signal holding a predetermined phase distribution is synthesizing outputted to only a specific output port by the output hybrid matrix 21-6.

HMA 22 has twelve ports, and except that the number of the input/output ports is different, HMA 22 is constructed similarly to HMA 21. That is, HMA 22 comprises an input hybrid matrix 22-1, amplifiers 22-2 to 22-13 and an output hybrid matrix 22-14. The input hybrid matrix 22-1 and the output hybrid matrix 22-14 can use such a construction as shown in FIG. 6C that the hybrid combiner HC are four-step connected in a such a manner that the input/output ports can be amounted to sixteen. In this construction, only twelve ports among sixteen ports are used (four ports which are not used are terminated by the non-reflecting terminations, or an unnecessary hybrid combiner is removed). The amplifiers 22-2 to 22-13 are always in a state of operation.

Figure 7:
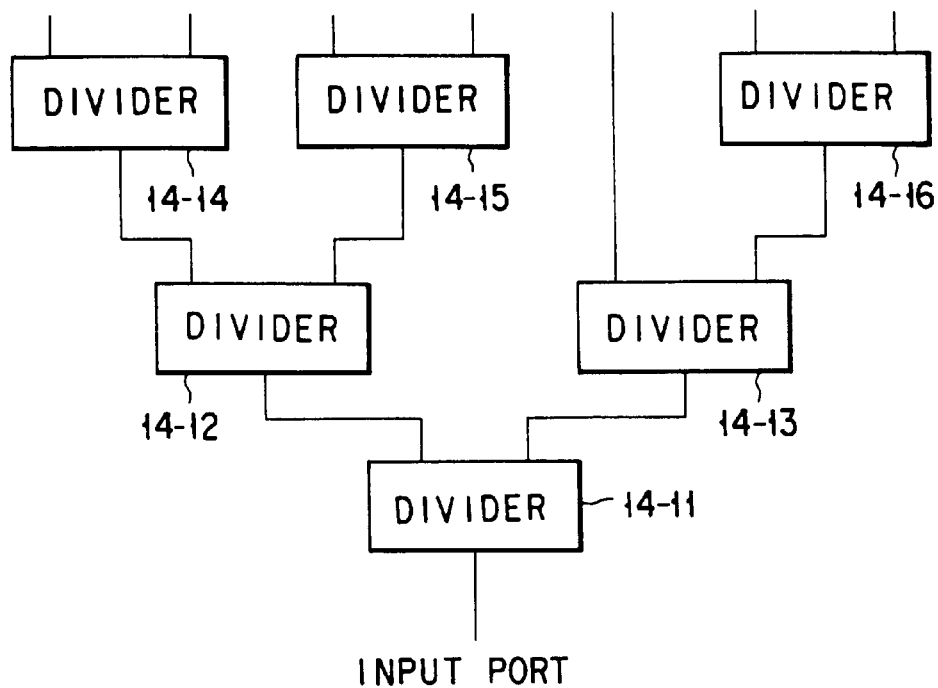
FIG. 7 is a block diagram showing a concrete construction of a beam forming network according to the first embodiment.

Next, a concrete example of the construction of each BFN 14-1 to 14-5 will be explained. As one example, BFN 14-1 will be explained, and other BFNs 14-2 to 14-5 can be also constructed similarly to the construction explained below. FIG. 7 shows the example of the construction.

In FIG. 7, the signal inputted from the input port is sequentially distributed by dividers 14-11 to 14-16, and the distributed signals are outputted to seven output ports. In this case, as each divider 14-11 to 14-16, a T-type branch, a directional coupler and the like are used, thereby the signal can be distributed at a predetermined ratio, and a predetermined amplitude distribution can be realized at the output ports. Furthermore, a transmission line length between the input port and the output port is adjusted, thereby the phase distribution of the signal outputted to each output port can be also set to a predetermined value. These amplitude distribution and phase distribution are held up to the element antenna of the cluster forming each beam #1 to #4, so that each element antenna T1 to T16 is excited with these amplitude distribution and phase distribution.

Figure 8:
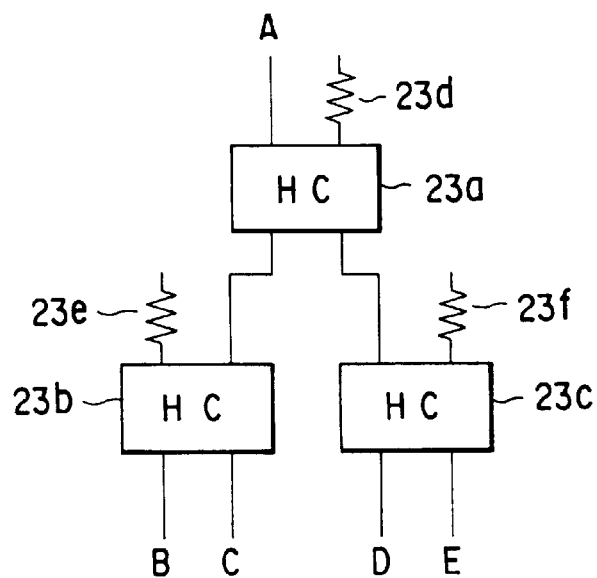
FIG. 8 is a block diagram showing a concrete construction of a combiner according to the first embodiment.

As the combiners 23-1 to 23-16, the construction as shown in FIG. 8 or FIG. 9 is considered. FIGS. 8 and 9 show the construction of the combiner for combining four signals, respectively, and a port A is arranged at the side of the element antenna (the output), and ports B, C, D, E are arranged at the side of BFN (the input).

FIG. 8 shows the construction of the combination of hybrid couplers (HC) 23a to 23c. One end of the output of each hybrid couplers 23a to 23c is terminated by non-reflecting terminations 23d to 23f, respectively. Instead of the hybrid couplers 23a to 23c, other type combiner (divider) such as the directional coupler and the T-type divider is used so that the same function can be also achieved. FIG. 9 shows the construction of the combiner (divider) using T-type divider 23g to 23i.

By the above construction, the excitation distribution necessary for carrying out the low side lobe and the shaped beam can be set by each BFN 14-1 to 14-5. This excitation distribution is inputted to HMAs 21 and 22, and each signal is amplified by using a plurality of amplifiers, and each signal is appropriately branch outputted to the corresponding element antennas T1 to T16. The element antennas T1 to T16 can be excited at a desired excitation distribution.

The multi-beam feeding apparatus according to the above construction is effective at the following points.

In the first place, HMAs 21 and 22 are used, thereby since the signal from each input port is equally divided to each amplifier 21-2 to 21-6, and 22-2 to 22-13 and the signal is amplified, the amplifier can be effectively used. Furthermore, when the capacity of communication between beams is varied, if the total capacity of communication is not changed, an operation state of a single amplifier is not changed. Accordingly, the capacity of communication between beams can be flexibly variable, thereby it is convenient to a multi beam satellite communication system.

Furthermore, since the operation state of the single amplifier can be always constantly kept, a supply power from a power source necessary for this operation can be suppressed to a minimum, and further the output power can be used to a maximum. Accordingly, using as the feeding system for the antenna to be mounted to the satellite having a limited power source is very effective.

Moreover, since HMAs 21 and 22 are disposed at the location near the element antennas T1 to T16, a region in which the signal having a large power is transmitted after the signal is amplified by the amplifier can be minimum. Thus, a power consumption due to a loss, etc., and a heat generation can be suppressed.

Furthermore, since BFNs 14-1 to 14-5 can set the excitation distribution in the region of a small signal, a small-sized more precise line using a planer circuit, etc., the branch and the like can be used, thereby it is convenient to setting a complex excitation distribution for carrying out the low side lobe and the beam shaping.

Furthermore, for example, as shown in FIG. 10, in addition to the construction shown in FIG. 7, variable phase shifters 14-21 to 14-27 and variable attenuators 14-31 to 14-37 having a characteristic for operating at high speed in higher performance can be used. By using BFNs 14-1 to 14-5, a flexible change of the excitation distribution relative to the element antennas T1 to T16 can be carried out in a simpler and small-sized construction.

Thus, such a function that the shapes of the beam #1 to #4 can be changed (a beam reformation) and the radiating direction of the beam can be changed (a beam scan) can be easily realized, thereby it is convenient to a high enhancement of the function of the antenna.

Furthermore, HMAs 21 and 22 are disposed at the location near the element antennas T1 to T16, thereby a problem occurred when the large power is transmitted for a passive intermodulation (PIM), multi factor breakdown, etc., can be reduced. Furthermore, in order to reduce PIM, a preparing method such as an integration formation of the feeding system is considered. However, in consideration of this point, the present invention can be easily prepared and made.

Furthermore, when the antenna according to the present invention is used for receiving the signal, since a feed line loss can be suppressed to the minimum at a portion from the element antennas T1 to T16 to the amplifiers, a deterioration of G/T can be prevented.

Furthermore, HMA is divided into HMA 21 and HMA 22, and HMA to be connected to the antenna element is selected according to a size of the excitation weight provided to the element antennas T1 to T16. Accordingly, it is possible to prevent a power leakage from the port which a large excitation weight is set from leaking to other ports having low excitation weight. Thus, an influence of an isolation characteristic between the ports of HMAs 21 and 22 does not have a bad influence upon the excitation weight of the element antennas T1 to T16, thereby the deterioration of a directivity combined in the entire cluster can be suppressed.

More specifically, in the multi-beam antenna forming a plurality of beams #1 to #4 and reusing the same frequency between the beams, the deterioration of the isolation characteristic between the ports of HMAs 21 and 22 does not deteriorate the isolation characteristic between the beams #1 to #4 sharing the same frequency band, thereby an excellent effect can be obtained.

Furthermore, the combiners 23-1 to 23-16 are disposed for every of all the element antennas T1 to T16, thereby the signals from different beam forming network are combined, and one element antenna can be excited. Accordingly, each element antenna can be shared with different beams. Each beam can independently flexibly set an excitation condition by each beam forming network, and the number of the excited element antennas can be flexibly set, thereby the shaped beam and a combination of the low side lobe pattern can be easily carried out.

Thus, not only the demands for various services can be easily responded, but also a plurality of different services and missions can be shared (fused). Since one antenna system can be shared with a plurality of applications, on the whole, consequently, a cost can be reduced, therefore the present invention is more effective.

According to the embodiment of the present invention, the following variations could obtain the similar effect.

In the first place, in the above explanation, the case of transmitting the signal is assumed. If the present invention is used for receiving the signal, the effect is not changed. When the signal is received, the signal is oppositely flowed, and the combiners 23-1 to 23-16 are changed to the dividers. Furthermore, it does not entirely matter that any system of devices such as the element antennas T1 to T16 and the beam forming network 14-1 to 14-5, a feed line system, the amplifier, etc. is used. Even if any system is used, the same effect can be obtained.

Regarding a cluster system, as shown in FIGS. 3A and 3B, the construction comprising seven element antennas is explained as the example. If other systems using nine element antennas and the like are used, the same effect can be obtained. Furthermore, regarding sharing the element antenna with the adjacent clusters, the case sharing four element antennas is shown in FIGS. 3A and 3B. The number of common elements antennas may be one, two and other values. Furthermore, the number of the element antennas excited for the beam shaping may be other values except for the case described in the embodiment.

All the combiners 23-1 to 23-16 are similarly constructed, thereby the beam forming network construction can get simpler, and a cost can be reduced. For example, as explained by the embodiment of the present invention, as the combiners 23-1 to 23-16, the same system having four input ports and one output port is used, thereby not only the combiner itself can be easily made, but also the construction and connection of the beam forming network 14-1 to 14-5 can get easier.

More specifically, in the case of the multi-beam antenna to be mounted to the satellite as shown in the embodiment, each beam pattern must have the low side lobe in such a manner that the frequency can be shared, and the excitation distributions for the low side lobe are substantially same in all the beams. The combiners 23-1 to 23-16 are similarly constructed, thereby even if an insertion loss in the combiners 23-1 to 23-16 occurs, the excitation condition for each beam forming network 14-1 to 14-5 becomes same. Accordingly, since the construction of the beam forming network 14-1 to 14-5 is entirely same, a making process gets simpler, and the cost can be reduced.

In the case of the system in which the phase distribution is generated at the input port of the combiners 23-1 to 23-16 (the case that a quadrature hybrid coupler and the like are used), such an input port that the phase condition in each combiner 23-1 to 23-16 becomes same is selected. The beam forming networks 14-1 to 14-5 of each beam are connected to the selected port, thereby the above effect can be obtained.

Embodiment 2

Next, another embodiment of the present invention will be explained.

FIG. 11 shows an example of the construction of the multi-beam feeding apparatus according to another embodiment of the present invention. The portions having the same reference numerals in FIG. 5 are the same portions in FIG. 11. An overlapping explanation is omitted.

In FIG. 11, each element antenna T1 to T16 is connected to the filters 13-1 to 13-6 suppressing an unnecessary radiation from respective antennas (for example, the non-linear distortion of the amplifier, the higher harmonic due to the intermodulation and the like), and further each element antenna is directly connected to amplifiers 24-1 to 24-16 and sequentially to the combiners 23-1 to 23-16. The signals from the beam forming networks (BFNS) 14-1 to 14-5 are inputted to each combiner 23-1 to 23-16. Each BFN 14-1 to 14-4 is the beam forming network corresponding to each beam #1 to #4. Furthermore, BFN 14-5 is connected to the paths of all the element antennas T1 to T16, and BFN 14-5 sets the appropriate excitation weight, thereby such a shaped beam as to cover the coverage of the beams #1 to #4 can be formed.

By the above construction, entirely similarly to the first embodiment, the beam formation and the low side lobe can be carried out for every beam. There is such an effect that the feed system construction for carrying out this operation gets simpler and the cost is reduced. According to the embodiment shown in FIG. 11, since it is so constructed that the amplifier is directly connected to every element antenna without using HMA, there is such an advantage that the operation of a hardware gets simpler and the hardware can be small-sized.

As described above, in the multi-beam feeding apparatus according to the present invention, not only there is such an advantage that the variation of the capacity of communication between the beams and the like can be flexibly corresponded, but also there is such effects that the feed system construction can be so simply constructed that the same systems are only combined, the power can be more effectively used, and such a problem as the heat generation or the like can be reduced. Furthermore, since one antenna system can fuse a plurality of missions, usage efficiency of the antenna is higher, and a low-costed and lightened system can be constructed. More specifically, as the application to the antenna to be mounted to the satellite and the like, more effect can be obtained.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

We claim:

1. A multi-beam feeding apparatus for forming a plurality of beams to be applied to a plurality of antenna elements forming a primary radiator adjacent to a reflector of a broadcast communications multi-beam antenna, said multi-beam feeding apparatus comprising:

a plurality of circuits including feeding circuits and at least one weighting circuit, wherein each of the feeding circuits is configured to provide oscillations for forming the plurality of beams and the weighting circuit is configured to provide an excitation weight for forming the plurality of beams;

a plurality of combiners, each of said combiners being connected to receive the oscillations from at least one of the feeding circuits and a corresponding excitation weight from the weighting circuit, said combiners being arranged in groups with each group of combiners having a similar output power level at a power level different from the power level of any other group; and a plurality of hybrid matrix amplifiers, each hybrid matrix amplifier being connected to the combiners of a particular group of combiners, each of said hybrid matrix amplifiers including, an input hybrid matrix including a combination of 90° hybrid couplers coupled to the of combiners of a particular group of combiners, a plurality of amplifiers coupled to the input hybrid matrix, and an output hybrid matrix including a combination of 90° hybrid couplers, said output hybrid matrix being coupled to at least some of the antenna elements.

2. A multi-beam feeding apparatus for forming a plurality of beams to be applied to a plurality of antenna elements forming a primary radiator adjacent to a reflector of a broadcast communications multi-beam antenna, said multi-beam feeding apparatus comprising:

a plurality of circuits including feeding circuits and at least one weighting circuit, wherein each of the feeding circuits is configured to provide oscillations for forming the plurality of beams and the weighting circuit is configured to provide an excitation weight for forming the plurality of beams;

a plurality of combiners, each of said combiners being connected to receive the oscillations from at least one of the feeding circuits and a corresponding excitation weight from the weighting circuit, said combiners being arranged in groups with each group of combiners having a similar output power level at a power level different from the power level of any other group; and a plurality of amplifiers connected between each of the combiners and each of the antenna elements.

3. A multi-beam feeding apparatus according to any one of claims 1 and 2, wherein said combiners are identical in structure.

4. A multi-beam feeding apparatus according to any one of claims 1 and 2, wherein said combiners are connected to the feeding circuits and the weighting circuit through input/output ports that are under an equivalent phase condition.

* * * * *